United States Patent

Ivey et al.

[15] 3,688,167
[45] Aug. 29, 1972

[54] SLAVE CURRENT CONTROL SYSTEM FOR A PLURALITY OF ELECTRIC MOTORS COUPLED TO A COMMON LOAD

[72] Inventors: Curtis L. Ivey; Alvin M. Vance, both of Williamsville; Hermann Eisele, Penn Hills, all of Pa.

[73] Assignee: Westinghouse Electric Corporation, Pittsburgh, Pa.

[22] Filed: Nov. 19, 1970

[21] Appl. No.: 90,965

[52] U.S. Cl.......................................318/45, 318/99
[51] Int. Cl...............................................H02p 7/68
[58] Field of Search.................318/45, 71, 77, 98, 99

[56] References Cited

UNITED STATES PATENTS 3,452,261 6/1969 Tagliasacchi.................318/45
3,551,775 12/1970 Safiuddin.....................318/71

Primary Examiner—Bernard A. Gilheany
Assistant Examiner—Thomas Langer
Attorney—F. H. Henson, R. G. Brodahl and J. J. Wood

[57] ABSTRACT

This disclosure relates to a motor control system for a plurality of direct current motors coupled through gearing or the like to a common load, so that all motors must rotate at the same speed. The torques exerted by all the motors are equalized by utilizing a current feedback signal as a control parameter derived from one master motor for regulating the currents through, and hence the torques exerted by, the other motors (identified as slave motors). The system additionally provides for deenergizing all motors whenever an overcurrent condition occurs, or when there is a shaft of pinion failure in any motor loop.

4 Claims, 1 Drawing Figure

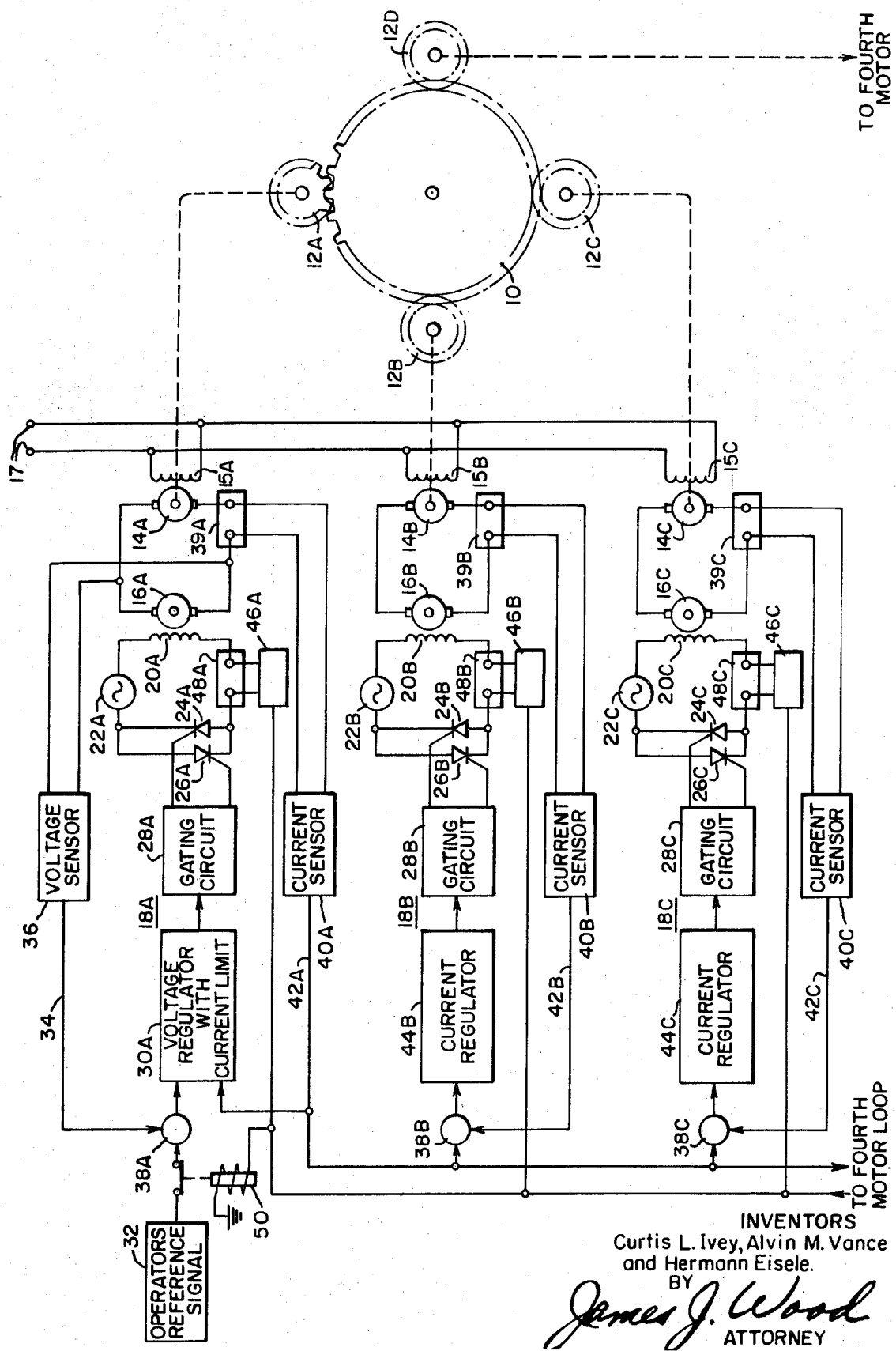
INVENTORS
Curtis L. Ivey, Alvin M. Vance
and Hermann Eisele.
BY
James J. Wood
ATTORNEY

SLAVE CURRENT CONTROL SYSTEM FOR A PLURALITY OF ELECTRIC MOTORS COUPLED TO A COMMON LOAD

BACKGROUND OF THE INVENTION

The slave current control system of the present invention finds general utility where a plurality of electric motors are coupled to a common load, and is herein illustrated as adapted for use in excavating machines powered by electric drives wherein each motion such as swing, hoist, drag or crowd is energized by a control system respectively. Theoretically these motions could be powered by a single motor; however, since the horsepower requirements for such applications are extremely high, a single motor would be excessively large with the concomitant disadvantage of possessing a large inertial mass. In order to overcome the inertial problem, and enable faster accelerations and decelerations, several smaller motors are employed instead of a single motor possessing the requisite power. The use of several motors reduces the gear stress concentrations throughout. Additionally, failure of the single motor would mean the complete cessation of operations, while the plural motor arrangement would permit the continuity of operations albeit at reduced capacity.

Usually, multiple motors are connected to a large bull gear through gear coupling, the bull gear thereof being connected to the load. Since the motors are all connected to the bull gear, of necessity they must rotate at the same speed. In an arrangement of this type, the motors are connected singly, or in pairs, to separate power sources such as for example the generator power supply in the well known Ward-Leonard concept. Additionally, thyristor power supplies may also be used in some applications. In the case of the generators, the field windings of the respective generators supplying power to the motors are connected to a common regulator output. If there are only two motors and two generators, they will usually be connected in a sandwich-series arrangement, so that the currents supplied to each motor are the same as will be their respective torques.

However, in applications requiring more than two motors, multiple motor-generator loops are required, each of which contains at least one motor and one generator, although two motors can be included in each loop. In this situation the torques exerted by the motors are not necessarily equal since the characteristics of the various loops can vary along with the currents flowing through the loops. The only way in which equal torques can be derived would be to have equal loop impedance, the same motor field strength, the same torque per ampere through equal air gaps, the same friction torque etc. Brush shifting can provide equal currents to enable balance of torque at stall conditions, but not necessarily at other points over the entire speed range. The brush shifting technique is time consuming and must be repeated each time a motor or generator is changed.

SUMMARY OF THE INVENTION

In accordance with the present invention, equal currents in a plurality of generator loops connected to a common load are derived by controlling the voltage and, hence, the speed in one master loop and by controlling the currents in the remaining slave loops, using as a reference the current in the master loop. Specifically, the system includes: (1) means for sensing the current flowing through the master loop, (2) means for sensing the current flowing through all the slave loops, (3) means for comparing each slave signal with the master signal to produce error signals for varying the currents through the respective remaining loops when the master and slave current signals for the respective loops are not equal. In this manner, the currents through all loops are made equal. Since all motors are connected to a common load, their speeds will be the same and limited only by the voltage control of the master loop.

Further, in accordance with the invention, if a pinion or shaft should fail protection is provided. If the failure is in the master loop, no torque will be produced because the master loop would have no current. Since the current reference in the master loop is zero, this would require zero current in the slave loop.

BRIEF DESCRIPTION OF THE DRAWING

The single drawing depicts the slave current control system for a plurality of electric motors coupled to a common load utilized with an excavator of the dragline type in accordance with the illustrative embodiment of the invention.

DESCRIPTION AND OPERATION OF AN EXEMPLARY EMBODIMENT

With reference now to the drawing, the system shown includes a large bull gear 10 which may, for example, be connected to the hoist or drag drum of a dragline excavator. Circumferentially spaced around the bull gear 10 are four pinion gears 12A, 12B, 12C and 12D coupled to associated direct current drive motors, only three of which are shown in the drawing and identified as 14A, 14B and 14C. The drive motors 14A through 14C, in turn, are powered in a Ward-Leonard arrangement by means of direct current generators 16A through 16C which are, in turn, driven by suitable drive motors, not shown. The generators 16A through 16C, as well as the motors 14A through 14C, are controlled by control loops 18A through 18C. Since many of the components are common to all the control loops they will only be described in detail in connection with the loop 18A, it being understood that the construction and operation of these components will be the same in the remaining loops.

Motors 14A, 14B and 14C have their respective field windings 15A, 15B and 15C connected in parallel to a common d.c. source of potential applied through terminals 17.

The generator 16A is provided with a field winding 20A connected to a source of alternating current potential 22A through thyristors 24A and 26A poled to conduct current in opposite directions. The thyristors 24A and 26A, are controlled by a gating circuit 28A in accordance with phase commutation techniques such that the polarity of the voltage impressed across field winding 20A will be dependent upon which one of the thyristors 24A or 26A is fired and the magnitude of the voltage will be a function of the point at which the thyristors are turned ON during each half cycle of the applied alternating current from source 22A.

In control loop 18A, the gating circuit 28A is controlled by a regulator 30A which may be either a voltage regulator with current limit or a current regulator with voltage limit. The regulator 30A may take various forms as is well known to those skilled in the art.

A feedback signal on lead 34 is derived from a voltage sensor 36 having input leads connected across the input armature terminals of motor 14A. An operator's reference signal 32 and the feedback signal on lead 34 are algebraically summed at a summing point 38A. If the signals are not the same then an error signal is applied to the regulator 30A which through the agency of the gating circuit 28A varies the excitation to the field winding 20A of generator until the reference signal and the feedback signal are equal. The speed of the motor 14A can be controlled by varying the operator's reference signal 32. Since the motors 14A, 14B and 14C are all geared to a common bull gear 10, they all rotate at the same speed; therefore a voltage regulator such as 30A is required for only the master loop 18A.

The current through motor 14A is sensed across a shunt 39A and applied to a current sensor 40A which produces a voltage signal on lead 42A proportional to the motor current; this current signal can be used in the voltage regulator 30A in accordance with well-known techniques in order to limit the maximum motor current.

The control loops 18B and 18C, unlike master loop 18A, do not include a voltage regulator similar to 30A; instead each includes a current regulator 44B and 44C. The output on lead 42A of the master loop current sensor 40A is utilized as a reference; it is summed at summing point 38B with the current feed back signal on lead 42B which is a function of the current in motor 14B. If the two are not the same, the current regulator 44B adjusts the gating signal of the gating circuit 28B to vary the current in the field winding 20B of generator 16B until the feedback signal (42B) is equal to their reference signal (42A).

Summarizing the operation of the invention, it will be appreciated that only the master loop 18A, controls the voltage applied to its associated motor 14A to determine the speed of the bull gear 10. The speeds of the motors 14B and 14C are equal to the speed of motor 14A since they are geared together. At the same time, the current through the motor 14A is sensed by current sensor 40A producing a master signal on lead 42A proportional to the current through motor 14A. This master reference signal on lead 42A is compared with slave feedback signals 42B and 42C derived from current sensors 40B and 40C to produce corrective action through the agency of regulators 44B and 44C when the master reference and feedback signals are not equal. Thus in accordance with the teachings of this invention, the currents through all the motors are controlled so that they are the same at all times.

In the event that one of the pinions 12A, 12B, 12C, etc. or a motor shaft should destruct or shear, then the motor will speed up since the affected loop will increase the current in the field winding 20A, 20B or 20C of its associated generator. This increase in field current will be sensed by the appropriate relay 46A, 46B or 46C connected respectively to shunts 48A, 48B or 48C in the field winding circuit for generators 16A, 16B and 16C. Should the current exceed a maximum permissible rating, one of the adjustable relays 46A, 46B or 46C will be energized to actuate a fail safe or suicide circuit here illustrated for simplicity as a protective relay 50. Thus, the system not only provides for equalizing loop currents through all motors, but further provides for automatic shut-down of the system upon breakage or destruction of a pinion or a motor shaft.

Although the invention has been shown and described in connection with a certain specific embodiment, it will be readily apparent to those skilled in the art that various changes in form and arrangement of parts may be made to suit requirements without departing from the spirit and scope of the invention. In this respect, it will be apparent that the motors 14A, 14B and 14C may be connected in sandwich series arrangement with respective generators.

We claim as our invention:

1. In a motor control system for a plurality of direct current motor means each provided with a separate power supply, and all coupled to a common load whereby all motors must rotate at the same speed; the combination for causing the currents through all motors means to be equal as well as the output torques thereof, comprising:
    means for producing a feedback signal which varies as a function of the speed of only one of said motor means, and for comparing said feedback signal with a reference signal to control the speed of said one motor,
    means for sensing the current flowing through said one motor means and for producing a master signal proportional thereto,
    means for sensing the currents flowing through the remaining said motor means and for producing slave signals proportional to the currents through the respective remaining said motor means, and
    means for comparing each of said slave signals with said master signal to produce error signals for varying the currents through the respective remaining motor means, when the slave and control signals for a respective motor means are not equal, until the currents through all motor means are equal and said error signals are reduced to zero.

2. The motor control system of claim 1 wherein the power supply for each motor means comprises a direct current generator, a control loop for each of said generators, the control loop for the generator for said one motor means including a voltage feedback network and a voltage controller, and the control loop for the remaining generators including a current sensor and a current regulator responsive to said error signals.

3. The motor control system of claim 2 including means for sensing the flow of current through the field winding of each of said direct current generators, and for disconnecting said reference signal from said control system when the current through the field winding of any generator exceeds a predetermined limit, indicating a loss of load on the motor connected to said any generator.

4. The motor control system of claim 1 wherein each motor means comprises a plurality of motors connected in series to an associated power supply.

* * * * *